(12) United States Patent
McAllister (10) Patent No.: US 10,846,497 B2
(45) Date of Patent: Nov. 24, 2020

(54) HOLONOMIC RFID READER

(71) Applicant: Clarke William McAllister, Eugene, OR (US)

(72) Inventor: Clarke William McAllister, Eugene, OR (US)

(73) Assignee: ADASA Inc., Eugene, OR (US)

( * ) Notice: Subject to any disclaimer, the term of this patent is extended or adjusted under 35 U.S.C. 154(b) by 0 days.

(21) Appl. No.: 16/595,777

(22) Filed: Oct. 8, 2019

(65) Prior Publication Data

US 2020/0050808 A1 Feb. 13, 2020

Related U.S. Application Data

(63) Continuation-in-part of application No. 16/036,852, filed on Jul. 16, 2018, now Pat. No. 10,476,130, which is a continuation-in-part of application No. 15/691,739, filed on Aug. 30, 2017, now Pat. No. 10,050,330, application No. 16/595,777, which is a continuation-in-part of application No. 15/393,499, filed on Dec. 29, 2016, now abandoned, which is a continuation-in-part of application No. 15/286,560, filed on Oct. 6, 2016, now Pat. No. 9,780,435, which is a continuation-in-part of application No. 15/286,560, filed on Oct. 6, 2016, now Pat. No. 9,780,435, which is a continuation-in-part of application No. 14/311,215, filed on Jun. 20, 2014, now abandoned, which is a continuation-in-part of application No. 13/693,026, filed on Dec. 3, 2012, now Pat. No. 9,747,480.

(60) Provisional application No. 62/238,105, filed on Oct. 6, 2015, provisional application No. 61/989,823, filed on May 7, 2014, provisional application No.
(Continued)

(51) Int. Cl.
*G06K 7/10* (2006.01)
*H01Q 7/00* (2006.01)
*G06Q 10/08* (2012.01)

(52) U.S. Cl.
CPC ..... *G06K 7/10366* (2013.01); *G06K 7/10356* (2013.01); *G06Q 10/087* (2013.01)

(58) Field of Classification Search
CPC .. G06K 7/10366; G06K 7/10356; H01Q 7/00; H01Q 1/28; H01Q 1/2216
See application file for complete search history.

(56) References Cited

U.S. PATENT DOCUMENTS 300,827 A 6/1884 Adams
552,271 A 12/1895 Bolton
(Continued)

FOREIGN PATENT DOCUMENTS

EP 1913235 7/2006
EP 1770591 A2 4/2007
(Continued)

OTHER PUBLICATIONS

Jae-Bok Song and Keung-Seok Byun, Design and Control of an Omnidirectional Mobile Robot with Steerable Omnidirectional Wheels, Mobile Robotics, Moving Intelligence, Jonas Buchli (Ed.), ISBN: 3-86611-284-X, InTech, http://www.intechopen.com/books/mobile_robotics_moving_intelligence/design_and_control_of_an_omnidirectional_mobile_robot_with_steerable_omnidirectional_wheels.
(Continued)

*Primary Examiner* — Albert K Wong (57) ABSTRACT

The present invention relates to inventory scanning using dual polarization radio frequency identification antennae for automatically reading and locating inventory.

6 Claims, 9 Drawing Sheets

Related U.S. Application Data

61/879,054, filed on Sep. 17, 2013, provisional application No. 61/838,186, filed on Jun. 21, 2013, provisional application No. 61/709,771, filed on Oct. 4, 2012, provisional application No. 61/708,207, filed on Oct. 1, 2012, provisional application No. 61/677,470, filed on Jul. 30, 2012, provisional application No. 61/567,117, filed on Dec. 5, 2011.

(56) References Cited

U.S. PATENT DOCUMENTS

| | | |
|---|---|---|
| 572,036 A | 11/1896 | Theryc |
| 2,190,717 A | 2/1940 | Kukop |
| 2,573,401 A | 10/1951 | Carter |
| 2,993,204 A | 7/1961 | Macalpine |
| 3,101,472 A | 8/1963 | Goubau |
| 3,336,530 A | 8/1967 | Sloan |
| 3,500,427 A | 3/1970 | Landesman |
| 3,699,585 A | 10/1972 | Morrison |
| 3,755,815 A | 8/1973 | Stangel |
| 3,766,558 A | 10/1973 | Kuechken |
| 3,836,979 A | 9/1974 | Kurland |
| 3,864,689 A | 2/1975 | Young |
| 4,023,167 A | 5/1977 | Wahlstrom |
| 4,129,866 A | 12/1978 | Turco |
| 4,163,233 A | 7/1979 | Becker |
| 4,203,105 A | 5/1980 | Dragone |
| 4,223,753 A | 9/1980 | Bradbury |
| 4,223,830 A | 9/1980 | Walton |
| 4,250,508 A | 2/1981 | Dragone |
| 4,278,977 A | 7/1981 | Nossen |
| 4,442,438 A | 4/1984 | Siwiak |
| 4,471,345 A | 9/1984 | Barrett |
| 4,476,469 A | 10/1984 | Lander |
| 4,519,466 A | 5/1985 | Shiraishi |
| 4,598,275 A | 7/1986 | Ross |
| 4,598,782 A | 7/1986 | Ilon |
| 4,636,950 A | 1/1987 | Caswell |
| 4,673,932 A | 6/1987 | Eckchian |
| 4,679,152 A | 7/1987 | Perdue |
| 4,751,658 A | 6/1988 | Kadonoff |
| 4,777,416 A | 10/1988 | George |
| 4,779,097 A | 10/1988 | Morchin |
| 4,809,178 A | 2/1989 | Ninomiya |
| 4,875,172 A | 10/1989 | Kanayama |
| 4,918,425 A | 4/1990 | Greenburg |
| 4,935,747 A | 6/1990 | Yuichi |
| 4,977,971 A | 12/1990 | Crane, III |
| 5,006,988 A | 4/1991 | Borenstein |
| 5,019,815 A | 5/1991 | Lemelson |
| 5,036,308 A | 7/1991 | Fockens |
| 5,040,116 A | 8/1991 | Evans |
| 5,073,749 A | 12/1991 | Kanayama |
| 5,146,235 A | 9/1992 | Frese |
| 5,155,684 A | 10/1992 | Burke |
| 5,165,064 A | 11/1992 | Mattaboni |
| 5,186,270 A | 2/1993 | West |
| 5,214,410 A | 5/1993 | Verster |
| 5,266,925 A | 11/1993 | Vercellotti |
| 5,280,159 A | 1/1994 | Schultz |
| 5,347,286 A | 9/1994 | Babitch |
| 5,374,879 A | 12/1994 | Pin |
| 5,381,137 A | 1/1995 | Ghaem |
| 5,382,784 A | 1/1995 | Eberhardt |
| 5,500,650 A | 3/1996 | Snodgrass |
| 5,530,330 A | 6/1996 | Baiden |
| 5,583,850 A | 12/1996 | Snodgrass |
| 5,621,199 A | 4/1997 | Calari |
| 5,627,544 A | 5/1997 | Snodgrass |
| 5,689,238 A | 11/1997 | Cannon |
| 5,708,423 A | 1/1998 | Ghaffafi |
| 5,734,353 A | 3/1998 | Voorhies |
| 5,763,867 A | 6/1998 | Main |
| 5,785,181 A | 7/1998 | Quartararo |
| 5,798,693 A | 8/1998 | Engellenner |
| 5,825,045 A | 10/1998 | Koenck |
| 5,825,298 A | 10/1998 | Walter |
| 5,850,187 A | 12/1998 | Carrender |
| 5,924,512 A | 7/1999 | Wada |
| 5,959,423 A | 9/1999 | Nakanishi |
| 5,962,837 A | 10/1999 | Main |
| 5,974,078 A | 10/1999 | Tuttle |
| 5,986,570 A | 11/1999 | Black |
| 5,990,847 A | 11/1999 | Filipovic |
| 5,995,017 A | 11/1999 | Marsh |
| 6,002,344 A | 12/1999 | Bandy |
| 6,076,025 A | 6/2000 | Ueno |
| 6,078,251 A | 6/2000 | Landt |
| 6,122,329 A | 9/2000 | Zai |
| 6,130,613 A | 10/2000 | Eberhardt |
| 6,184,841 B1 | 2/2001 | Shober |
| 6,195,006 B1 | 2/2001 | Bowers |
| 6,195,053 B1 | 2/2001 | Kodukula |
| 6,354,493 B1 | 3/2002 | Mon |
| 6,397,063 B1 | 5/2002 | Sessions |
| 6,414,626 B1 | 7/2002 | Greef |
| 6,415,978 B1 | 7/2002 | McAllister |
| 6,459,726 B1 | 10/2002 | Ovard |
| 6,486,780 B1 | 11/2002 | Garber |
| 6,584,375 B2 | 6/2003 | Bancroft |
| 6,653,987 B1 | 11/2003 | Lamensdorf |
| 6,667,592 B2 | 12/2003 | Jacobs |
| 6,677,852 B1 | 1/2004 | Landt |
| 6,724,308 B2 | 4/2004 | Nicholson |
| 6,809,490 B2 | 10/2004 | Jones |
| 6,810,976 B2 | 11/2004 | Rohrs |
| 6,830,181 B1 | 12/2004 | Bennett |
| 6,853,878 B2 | 2/2005 | Hirayama |
| 6,888,333 B2 | 5/2005 | Laby |
| 7,023,341 B2 | 4/2006 | Stilp |
| 7,056,185 B1 | 6/2006 | Anagnostou |
| 7,057,492 B2 | 6/2006 | Jackson |
| 7,068,210 B1 | 6/2006 | Atindra |
| 7,075,435 B2 | 7/2006 | Jesser |
| 7,118,036 B1 | 10/2006 | Couch |
| 7,119,738 B2 | 10/2006 | Bridgelall |
| 7,223,030 B2 | 5/2007 | Fessler |
| 7,236,091 B2 | 6/2007 | Kiang |
| 7,245,215 B2 | 7/2007 | Gollu |
| 7,250,845 B2 | 7/2007 | Mick |
| 7,265,674 B2 | 9/2007 | Tuttle |
| 7,319,397 B2 | 1/2008 | Chung |
| 7,321,305 B2 | 1/2008 | Gollu |
| 7,332,890 B2 | 2/2008 | Cohen |
| 7,400,989 B2 | 7/2008 | Chapman |
| 7,427,955 B2 | 9/2008 | Choi |
| 7,446,662 B1 | 11/2008 | Somogyi |
| 7,455,217 B2 | 11/2008 | Taylor |
| 7,538,946 B2 | 5/2009 | Smith |
| 7,548,166 B2 | 6/2009 | Roeder |
| 7,603,291 B2 | 10/2009 | Raiyani |
| 7,641,288 B1 | 1/2010 | Baker |
| 7,669,763 B2 | 3/2010 | Ernesti |
| 7,673,710 B2 | 3/2010 | Lee |
| 7,693,757 B2 | 4/2010 | Zimmerman |
| 7,733,230 B2 | 6/2010 | Bomber |
| 7,747,477 B1 | 6/2010 | Louis |
| RE41,531 E | 8/2010 | Wood |
| RE41,562 E | 8/2010 | Dando |
| 7,821,391 B2 | 10/2010 | Gupta |
| 7,822,424 B2 | 10/2010 | Markhovsky |
| 7,830,262 B1 | 11/2010 | Diorio |
| 7,860,680 B2 | 12/2010 | Arms |
| 7,876,224 B2 | 1/2011 | Prokopuk |
| 7,877,166 B2 | 1/2011 | Harwig |
| 7,916,028 B2 | 3/2011 | Oberle |
| 7,932,827 B2 | 4/2011 | Chand |
| 8,022,812 B2 | 9/2011 | Beniyama |
| 3,031,070 A1 | 10/2011 | Fabre |
| 8,072,311 B2 | 12/2011 | Sadr |
| 8,077,041 B2 | 12/2011 | Stern |
| 8,083,013 B2 | 12/2011 | Bewley |
| 8,085,150 B2 | 12/2011 | Oberle |
| 8,106,746 B2 | 1/2012 | Maltseff |

(56) References Cited

U.S. PATENT DOCUMENTS

| | | |
|---|---|---|
| 8,174,369 B2 | 5/2012 | Jones |
| 8,212,533 B2 | 7/2012 | Ota |
| 8,237,563 B2 | 8/2012 | Schatz |
| 8,289,129 B2 | 10/2012 | Bauchot |
| 8,294,554 B2 | 10/2012 | Shoarinejad |
| 8,340,438 B2 | 12/2012 | Anderson |
| 8,412,450 B1 | 4/2013 | Huebner |
| 8,423,548 B1 | 4/2013 | Trandal |
| 8,430,192 B2 | 4/2013 | Gillett |
| 8,532,846 B2 | 9/2013 | Tollenaere |
| 8,542,114 B2 | 9/2013 | Stolarczyk |
| 8,556,173 B1 | 10/2013 | Huebner |
| 8,618,928 B2 | 12/2013 | Weed |
| 8,754,752 B2 | 6/2014 | Shoarinejad |
| 8,761,603 B1 | 6/2014 | Maleki |
| 8,958,911 B2 | 2/2015 | Wong |
| 9,061,102 B2 | 6/2015 | Levien |
| 9,067,671 B2 | 6/2015 | Stark |
| 9,323,250 B2 | 4/2016 | Wang |
| 9,534,899 B2 | 1/2017 | Gutmann |
| 9,579,927 B2 | 2/2017 | Parrott |
| 10,037,449 B1 | 7/2018 | Hahn |
| 10,336,543 B1 | 7/2019 | Sills |
| 10,366,261 B2 | 7/2019 | Jones |
| 2002/0005774 A1 | 1/2002 | Rudolph |
| 2002/0070862 A1 | 6/2002 | Francis |
| 2002/0165790 A1 | 11/2002 | Bancroft |
| 2003/0080901 A1 | 5/2003 | Piotrowski |
| 2003/0137268 A1 | 7/2003 | Papanikolopoulos |
| 2003/0196840 A1 | 10/2003 | Rohrs |
| 2003/0236590 A1 | 12/2003 | Park |
| 2004/0074964 A1 | 4/2004 | Falkenrich-Wesche |
| 2004/0138547 A1 | 7/2004 | Wang |
| 2004/0153211 A1 | 8/2004 | Kamoto |
| 2005/0083011 A1 | 4/2005 | Yang |
| 2005/0134106 A1 | 6/2005 | Guile |
| 2005/0149226 A1 | 7/2005 | Stevens |
| 2005/0200457 A1 | 9/2005 | Bridgelall |
| 2005/0231156 A1 | 10/2005 | Yan |
| 2005/0246248 A1 | 11/2005 | Vesuna |
| 2006/0068711 A1 | 3/2006 | Chiu |
| 2006/0114104 A1 | 6/2006 | Scaramozzino |
| 2007/0061041 A1 | 3/2007 | Zweig |
| 2007/0073513 A1 | 3/2007 | Posamentier |
| 2007/0131754 A1 | 6/2007 | Brandon |
| 2007/0142964 A1 | 6/2007 | Abramson |
| 2007/0176780 A1 | 8/2007 | Hart |
| 2007/0222665 A1 | 9/2007 | Koeneman |
| 2007/0250212 A1 | 10/2007 | Halloran |
| 2007/0252696 A1 | 11/2007 | Belisle |
| 2007/0282482 A1 | 12/2007 | Beucher |
| 2008/0042847 A1 | 2/2008 | Hollister |
| 2008/0068173 A1 | 3/2008 | Alexis |
| 2008/0077511 A1 | 3/2008 | Zimmerman |
| 2008/0106377 A1 | 5/2008 | Flores |
| 2008/0133052 A1 | 6/2008 | Jones |
| 2008/0156616 A1 | 7/2008 | Chu |
| 2008/0157967 A1 | 7/2008 | Jones |
| 2008/0191873 A1 | 8/2008 | Minerley |
| 2008/0191881 A1 | 8/2008 | Minerley |
| 2008/0224871 A1 | 9/2008 | Bolotin |
| 2008/0231457 A1 | 9/2008 | Mattice |
| 2008/0266092 A1 | 10/2008 | Campero |
| 2009/0012667 A1 | 1/2009 | Matsumoto |
| 2009/0016308 A1 | 1/2009 | Twitchell |
| 2009/0021351 A1 | 1/2009 | Beniyama |
| 2009/0146792 A1 | 6/2009 | Sadr |
| 2009/0231138 A1 | 9/2009 | Lai |
| 2009/0243924 A1 | 10/2009 | Twitchell |
| 2010/0049368 A1 | 2/2010 | Chen |
| 2010/0100269 A1 | 4/2010 | Ekhaguere |
| 2010/0109844 A1 | 5/2010 | Carrick |
| 2010/0131121 A1 | 5/2010 | Gerlock |
| 2010/0187779 A1 | 7/2010 | Potter |
| 2010/0309017 A1 | 12/2010 | Ramchandran |
| 2010/0310019 A1 | 12/2010 | Sadr |
| 2011/0090059 A1 | 4/2011 | Sadr |
| 2011/0254664 A1 | 10/2011 | Sadr |
| 2011/0315765 A1 | 12/2011 | Schantz |
| 2012/0083945 A1 | 4/2012 | Oakley |
| 2012/0112904 A1 | 5/2012 | Nagy |
| 2012/0136630 A1 | 5/2012 | Murphy |
| 2012/0139704 A1 | 6/2012 | Sadr |
| 2012/0188058 A1 | 7/2012 | Lee |
| 2012/0197439 A1 | 8/2012 | Wang |
| 2012/0212331 A1 | 8/2012 | Jones |
| 2012/0271461 A1 | 10/2012 | Spata |
| 2012/0273284 A1 | 11/2012 | Nesnas |
| 2012/0274525 A1 | 11/2012 | Lam |
| 2012/0275546 A1 | 11/2012 | Divsalar |
| 2012/0293373 A1 | 11/2012 | You |
| 2013/0024219 A1 | 1/2013 | Martinez |
| 2013/0218721 A1 | 8/2013 | Borhan |
| 2013/0233964 A1 | 9/2013 | Woodworth |
| 2014/0032034 A1 | 1/2014 | Raptopoulos |
| 2014/0061377 A1 | 3/2014 | Smith |
| 2014/0197280 A1 | 7/2014 | Smith |
| 2014/0247116 A1 | 9/2014 | Davidson |
| 2014/0277854 A1 | 9/2014 | Jones |
| 2016/0316255 A1 | 10/2016 | Tseng |
| 2016/0365737 A1 | 12/2016 | Vladan |
| 2016/0371631 A1 | 12/2016 | Jetcheva |
| 2017/0174343 A1 | 6/2017 | Erickson |
| 2017/0178072 A1 | 6/2017 | Poomachandran |

FOREIGN PATENT DOCUMENTS

| | | |
|---|---|---|
| EP | 1941411 A2 | 7/2008 |
| EP | 2017768 A1 | 1/2009 |
| EP | 2205333 | 7/2010 |
| EP | 2484892 A2 | 8/2012 |
| EP | 2769809 A1 | 8/2014 |
| EP | 3125063 A1 | 2/2017 |
| WO | WO2005076929 | 8/2005 |
| WO | WO2006039119 | 4/2006 |
| WO | WO2006076283 | 7/2006 |
| WO | WO2007047510 | 4/2007 |
| WO | WO2007094868 | 8/2007 |
| WO | WO2008097509 | 8/2008 |
| WO | WO2008118875 | 10/2008 |
| WO | WO2009157653 A3 | 12/2009 |
| WO | WO2011088182 | 7/2011 |
| WO | WO2011135328 | 11/2011 |
| WO | WO2011135329 | 11/2011 |
| WO | WO2013071150 | 5/2013 |
| WO | WO2019139930 A1 | 1/2018 |
| WO | WO2018140694 A1 | 2/2018 |

OTHER PUBLICATIONS

Stephen M. Killough and Francois G. Pin, Design of an Omnidirectional and Holonomic Wheeled Platform Prototype, The 1992 IEEE International Conference on Robotics and Automation, Nice, France May 10-15, 1992.

Claire Swedberg, Robotic RFID Reader Automates Inventory Tracking, RFID Journal, Nov. 28, 2012.

Anderson, Ross, The Quadix, Apr. 19, 2004 1-4; https://www.yumpu.com/en/document/view/35443620/amateur-radio-antenna-projects-2004/1744.

Completech, ComAnt CAX+ Cross-Polarized YAGI; https://www.completech.fi/assets/CAX+.pdf.

HOLONOMIC RFID READER

RELATED APPLICATIONS

The present application is a continuation-in-part application of co-pending U.S. patent application Ser. No. 16/036,852 filed 16 Jul. 2018 which is a continuation-in-part application of U.S. Pat. No. 10,050,330 filed 30 Aug. 2017 which is a continuation-in-part application of U.S. patent application Ser. No. 15/286,560 filed 6 Oct. 2016 which is U.S. Pat. No. 9,780,435 and of U.S. patent application Ser. No. 14/311,215 filed 20 Jun. 2014 that claim priority and benefit based on U.S. patent application Ser. No. 13/693,026 filed on 3 Dec. 2012 by the same inventor Clarke W. McAllister. The present application also claims priority and benefit under 35 USC Section 119(e) of U.S. Provisional Application Ser. No. 62/238,105 filed on 6 Oct. 2015 all by the same inventor Clarke W. McAllister, the disclosures of which are expressly incorporated herein by reference. Also the following filed 7 May 2014, and 61/567,117 filed 5 Dec. 2011, and 61/677,470 filed 30 Jul. 2012, and 61/708,207 filed 1 Oct. 2012, and of 61/709,771 filed 4 Oct. 2012, all by the same inventor Clarke W. McAllister.

The present application is also a continuation-in-part application of co-pending U.S. patent application Ser. No. 15/393,499 filed 29 Dec. 2016 which is a continuation-in-part application of U.S. Pat. No. 9,780,435 filed 6 Oct. 2016 claims priority and benefit under 35 USC Section 119(e) of U.S. Provisional Application Ser. No. 62/238,105 filed on 6 Oct. 2015 all by the same inventor Clarke W. McAllister, the disclosures of which are expressly incorporated herein by reference.

BACKGROUND

The present invention relates to an RFID reader device having six degrees of holonomic motion for inventory scanning. Holonomic means that the degrees of freedom that can be controlled by the device are equal to the total degrees of freedom of the device.

Translational x, y, z axis scanning motion with three degrees of rotation is made possible by a novel lightweight dual polarization RFID reader. The six axis RFID reader is small enough to squeeze through densely packed retail sales floors as well as fit into popular Pelican travels cases for easy transport to multiple retail stores.

The RFID reader interrogates or encodes radio-frequency identification (RFID) transponders. Working together RFID transponders, encoders, and readers enable improved identification and tracking of objects by encoding data electronically in a compact tag or label. Radio-frequency identification (RFID) transponders, typically thin transceivers that include an integrated circuit chip having radio frequency circuits, control logic, memory and an antenna structure mounted on a supporting substrate, enable vast amounts of information to be encoded and stored and have unique identification.

RFID transponders rank into two primary categories: active (or battery assist) RFID transponders and passive RFID transponders. Active RFID transponders include an integrated power source capable of self-generating signals, which may be used by other, remote reading devices to interpret the data associated with the transponder. Active transponders include batteries and, historically, are considered considerably more expensive than passive RFID transponders. Passive RFID transponders backscatter incident RF energy to remote devices such as interrogators.

Reflections from shelving and other metal objects in the field of an RFID reader are can blind and possibly saturate baseband amplifiers preventing tag reading. Circularly polarized (CP) antennae have vector rotation noise that results in periodic polarization misalignments with linearly polarized RFID transponders at quarter wavelength intervals from the CP antenna. Aerial RFID scanning also introduces significant ground-bounce problems that also result in poor RFID transponder interrogation performance. These and other problems are overcome by the presently disclosed invention. No prior art comprehensively teaches systems, methods or devices for automatically determining the location of RFID-tagged inventory.

SUMMARY OF THE INVENTION

In the present invention seven important problems are solved to make RFID inventory counting and localization a commercial reality for retail stores engaging in omnichannel retailing, including and especially for retailers that want to use their retail sales for as a forward warehouse for fulfillment of consumer's online orders for same day delivery or in-store pickup. In these highly competitive retail environments such as this, inventory errors can result in disastrous customer relationship problems when a retailer promises delivery or pickup of an item that is not actually in stock, ready to hand over to a waiting customer. Therefore, it is in this context that the following seven solution criteria make sense from a retail business perspective: push-button inventory, safety, high availability, quiet operation, minimal disturbance to sales floor, centimeter location accuracy, and low capital expense.

Push-button inventory solutions are achieved when RFID tags are read automatically. This usually means that some sort of RFID tag scanning is used. RF beams are either fixed or moving. Moving beams are either mechanically or electronically steered to various locations and vector angles. The present invention uses a beam positioning system to steer RF interrogation beam(s), preferably to illuminate and interrogate each RFID tag without incurring direct labor to do so.

Safe movement of a scanning device requires separation of people and object from fast-moving parts of the device, including the device itself. In the present invention the requirements for overcoming the force of gravity to lift and move the device required to form a beam, transmit RF energy, and collect RFID tag data is best achieved by employing boom. In the present invention a dual-elliptically polarized antenna provides beam focusing from a high gain antenna that weighs only about 3-5 ounces or about 115 grams.

High availability is realized by the present invention by a mobile platform that quietly rolls through tagged inventory items and elevates a scanning antenna to various altitudes of interest. Centimeter accuracy enables high-resolution item localization accuracy.

Low capital expense relative to large arrays of fixed overhead RFID readers is obvious, such solutions do not scale nearly as well as the present invention. That is because a single mobile six-axis RFID reader can read RFID tags over a much greater area than even the best long-range RFID readers. RF beam-steered RFID readers also have a high cost of the equipment and the wiring that is required to power them.

The present invention discloses devices for automatically reading and locating RFID-tagged assets including retail goods, automobiles, and commercial transport trailers.

The term 'robot' means a machine that is capable of automatically carrying out a complex series of actions. Robots of the present invention are optimized and disclosed and claimed for reading RFID tags in retail store environments where metal display racks and shelves reduce the read rate and inventory accuracy of systems that fail to avoid blinding or shielding reflections from typical indoor propagation environments. The present invention overcomes limitations of prior art by avoiding unwanted carrier signal nulls and interfering reflection paths by using novel scanning devices, features, and methods.

DESCRIPTION OF THE INVENTION

Making reference to various figures of the drawings, possible embodiments of the present invention are described and those skilled in the art will understand that alternative configurations and combinations of components may be substituted without subtracting from the invention. Also, in some figures certain components are omitted to more clearly illustrate the invention, similar features share common reference numbers.

To clarify certain aspects of the present invention, certain embodiments are described in a possible environment—as identification means for retail items that are bought and used by consumers. In these instances, certain methods make reference to items such as clothing, garments, shoes, consumables, electronics, and tires, but other items may be used by these methods. Certain embodiments of the present invention are directed for identifying objects using RFID transponders in supply chains, retail stores, warehouses, and distribution centers—both indoors and outdoors.

Some terms are used interchangeably as a convenience and, accordingly, are not intended as a limitation. For example, transponder is a term for wireless sensors that is often used interchangeably with the term tags and the term inlay, which is used interchangeably with inlet. This document generally uses the term tag or RF tag to refer to passive inlay transponders, which do not include a battery, but include an antenna structure coupled to an RFID chip to form an inlay which is generally thin and flat and substantially co-planar and may be constructed on top of a layer of foam standoff, a dielectric material, or a folded substrate. One common type of passive inlay transponder further includes a pressure-sensitive adhesive backing positioned opposite an inlay carrier layer. Chipless RFID transponders are manufactured using polymers instead of silicon for cost reduction. Graphene tags offer similar benefits. Inlays are frequently embedded in hang tags, pocket flashers, product packaging, and smart labels. A third type: a battery-assist tag is a hybrid RFID transponder that uses a battery to power the RFID chip and a backscatter return link to the interrogator.

The systems, methods, and devices of the present invention utilize an RFID transponder or wireless sensors as a component. Certain RFID transponders and wireless sensors operate at Low Frequencies (LF), High Frequencies (HF), Ultra High Frequencies (UHF), and microwave frequencies. HF is the band of the electromagnetic spectrum that is centered around 13.56 MHz. UHF for RFID applications spans globally from about 860 MHz to 960 MHz. Transponders and tags responsive to these frequency bands generally have some form of antenna. For LF or HF there is typically an inductive loop. For UHF there is often an inductive element and one or more dipoles or a microstrip patch or other microstrip elements in their antenna structure. Such RFID transponders and wireless sensors utilize any range of possible modulation schemes including: amplitude modulation, amplitude shift keying (ASK), double-sideband ASK, phase-shift keying, phase-reversal ASK, frequency-shift keying (FSK), phase jitter modulation, time-division multiplexing (TDM), or Ultra Wide Band (UWB) method of transmitting radio pulses across a very wide spectrum of frequencies spanning several gigahertz of bandwidth. Modulation techniques may also include the use of Orthogonal Frequency Division Multiplexing (OFDM) to derive superior data encoding and data recovery from low power radio signals. OFDM and UWB provide a robust radio link in RF noisy or multi-path environments and improved performance through and around RF absorbing or reflecting materials compared to narrowband, spread spectrum, or frequency-hopping radio systems. Wireless sensors are reused according to certain methods disclosed herein. UWB wireless sensors may be combined with narrowband, spread spectrum, or frequency-hopping inlays or wireless sensors.

A common cause for RFID tags to not read is for a tag to be located at a null in the carrier field. Nulls typically occur at quarter-wavelength intervals, or every three inches along a 915 MHz beam path between a typical circularly polarized antenna and a typical linearly polarized RFID transponder. Circularly polarized antenna exhibit the problem of vector rotation noise because the propagating electric field from the antenna rotates along a spiral path. If the electric field vector aligns with the transponder's strongest polarization, then the tag will readily read. On the contrary, if the field vectors are misaligned, the tags receive less energy and if they respond, will backscatter less energy to the RFID antenna and reader. The RSSI noise that is observed by the reader is typically about 4 dB from peak-to-peak which is over a 2× difference in returned signal strength. This noise confounds RFID tag localization efforts.

An inadequate operational solution to this problem is to scan again from a different angle, polarization angle, and or distance for reducing location errors.

Referring to RFID reader 1 of FIGS. 1-3, 5,6 a preferred beam forming solution is to use dual elliptical antenna 90 or 90a. Each antenna 90 or 90a is aligned back-to-back along their bore sight axes with a space of about 5 inches between their rear toroidal reflector loops 11. Each antenna 90 or 90a is a high-gain elliptically polarized four-element antenna, which is an improved antenna that is derived from a much larger, and heavier prior art Quadix 146 MHz Ham radio design by Ross Anderson W1HBQ. Antenna 90 and 90a have advantages such as minimal weight and minimal wind load due to its small surface area. Wind load force is calculated as one-half of the density of air times the velocity squared times the surface area presented to the wind. Antenna 90 and 90a has a reduced surface area, which when computed over the entire structure on all sides is about 150 square inches.

Preferred embodiments of antenna 90 and 90a use 16 AWG half-hard brass wire for the elements. The total weight is about five ounces, and when weighed in grams in any case is less than 200 grams. With respect to a UAV, these are advantages over a high gain patch or panel antennae, a Yagi-Uda, or a conventional helix with the large reflector that it requires.

This novel antenna, designed for aerial RFID scanning is also related to a bifilar helical antenna wherein its traditional metal ground plane reflector that is typically used in prior art helical antennae, is replaced by the combination of toroidal reflector loop 11 and a director toroidal loop 13.

Figure 4:
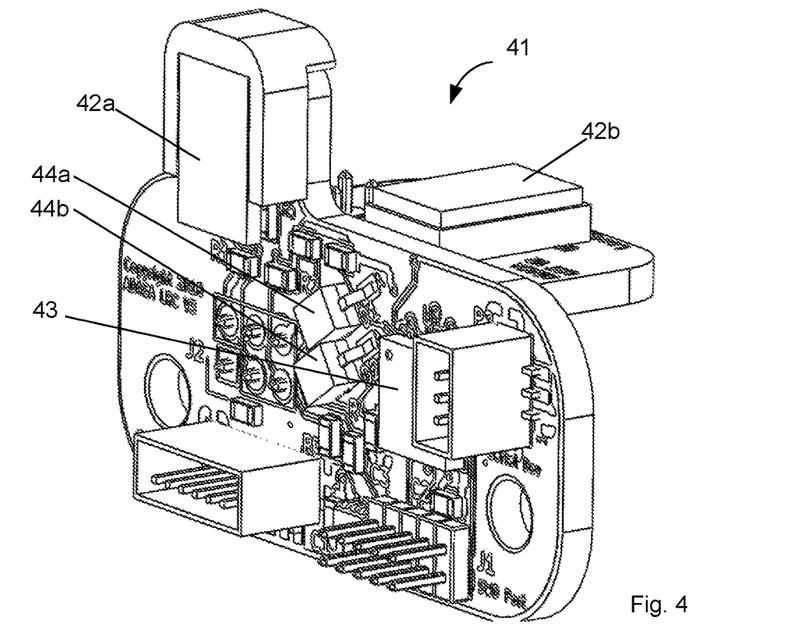
FIG. 4 is a two-axis laser ranging module according to one embodiment of the present invention.

Referring now to FIG. 4 the distance to surrounding objects and persons is measured using laser ranging module 41. The ST VL53L1X Time-of-Flight 940 nm laser-ranging sensor is used in two orthogonal orientations on laser ranging module 41 to measure the absolute distance regardless of object color or reflectance. The VL53L1X sensors are located under protective acrylic cover glass 42a and 42b and both are calibrated for crosstalk resulting from reflections from the inner surfaces of covers 42a-b. Ranging is controlled by microcontroller 43 which in preferred embodiments is an NXP Kinetis MKL16Z64VFM4 with an ARM Cortex-M0+ 48 MHz core and two I2C ports to control the VL53L1X sensors.

Referring to FIGS. 1-3, and 5 preferred embodiments of RFID reader 1 have a sensor pod 3b that contains two laser ranging modules 41, each with two VL53L1X sensors, for a combined total of four sensors that scan the surrounding environment for obstacles and people. Preferably contained within sensor pod 3b is also sonar 3c such as a MaxBotix MB1000 LV-MaxSonar-EZ0 sonar range finder with a beam that projects outward from RFID reader 1.

Figure 5:
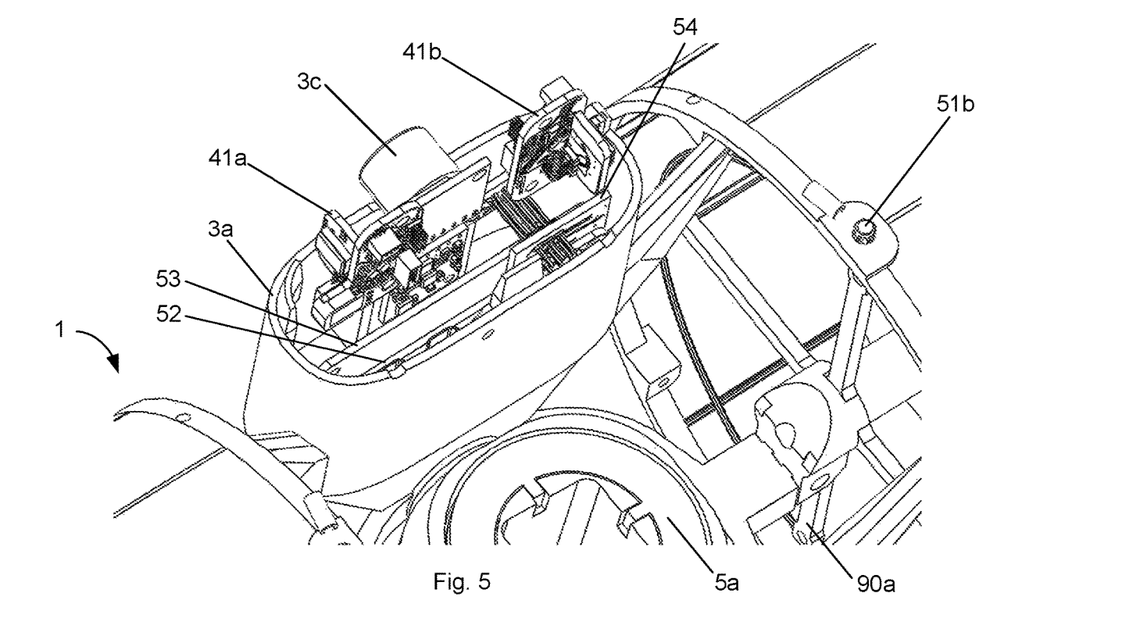
FIG. 5 is a view of a mapping and computing module according to one embodiment of the present invention.

Referring to FIG. 5 computation pod 3a is below sensor pod 3b and contains CPU 52, USB expansion board 53, and navigation sensor controller 54. Preferred embodiments of RFID reader 1 use navigation sensor controller 54 to map the movements of RFID reader 1 by using an IMU (Inertial Measurement Unit) preferably comprising a triaxial (i.e. 3-axis) accelerometer, a 3-axis gyroscope, and a 3-axis magnetometer such as a Hillcrest BN0085 with a 32-bit ARM Cortex microcontroller running Hillcrest SH-2 firmware and an enhanced sensor fusion algorithm.

The Hillcrest SH-2 firmware includes software which provides sophisticated signal processing algorithms to process sensor data and provide precise real-time 3D orientation, heading, calibrated acceleration and calibrated angular velocity. Navigation sensor controller 54 traces the movements of RFID reader 1 through its surrounding environment.

CPU 52 is preferably a compact 32-bit computer such as a Raspberry Pi Zero W. CPU 52 preferably combines output from navigation sensor controller 54 and real-time ranging data from laser ranging module 41a and 41b, and sonar 3c to produce a more refined estimate of the location of RFID reader 1.

Figure 9:
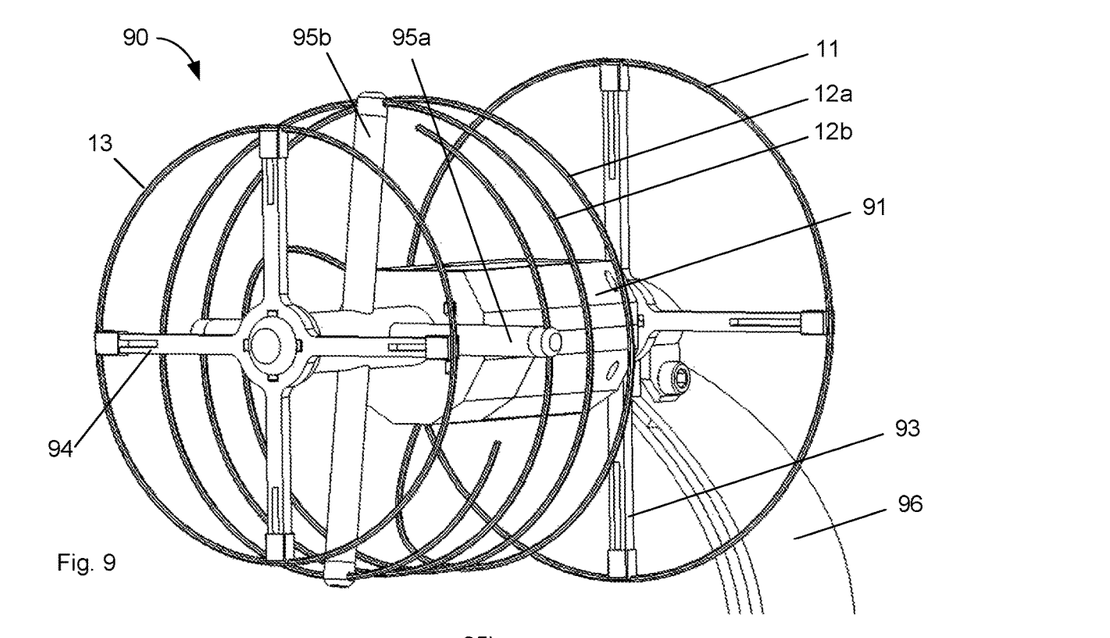
FIG. 9 is a directional dual-elliptical polarization UHF RFID antenna with end-fed exciters according to one embodiment of the present invention.
Figure 10:
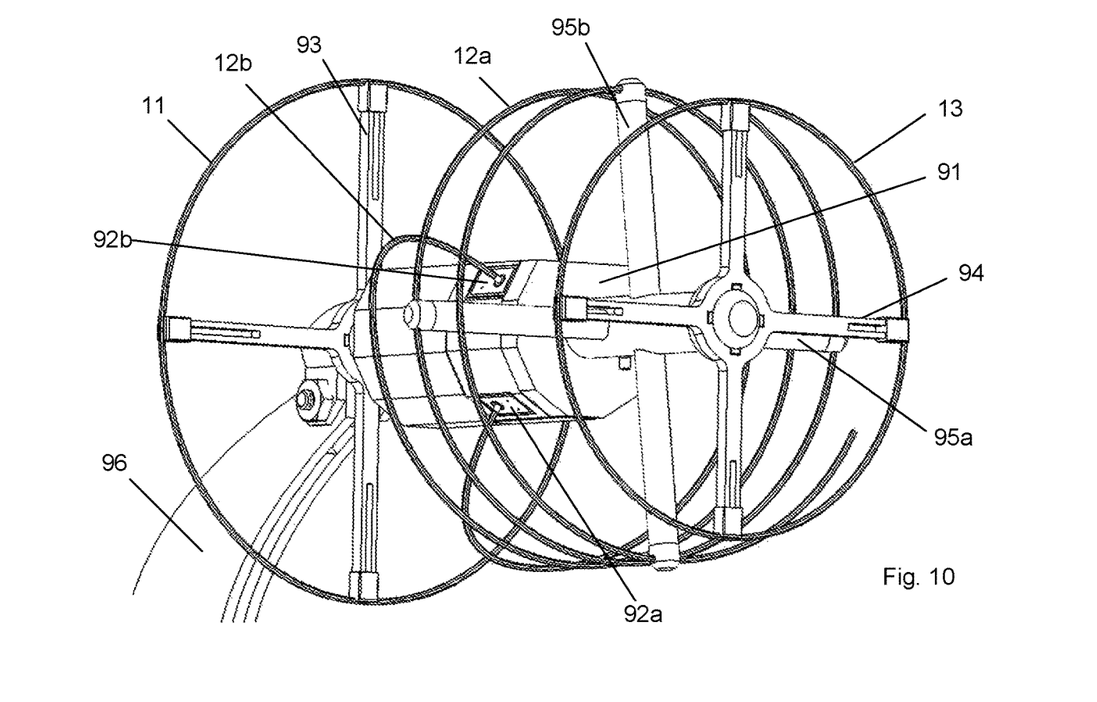
FIG. 10 is a directional dual-elliptical polarization UHF RFID antenna with end-fed exciters according to one embodiment of the present invention.
Figure 11:
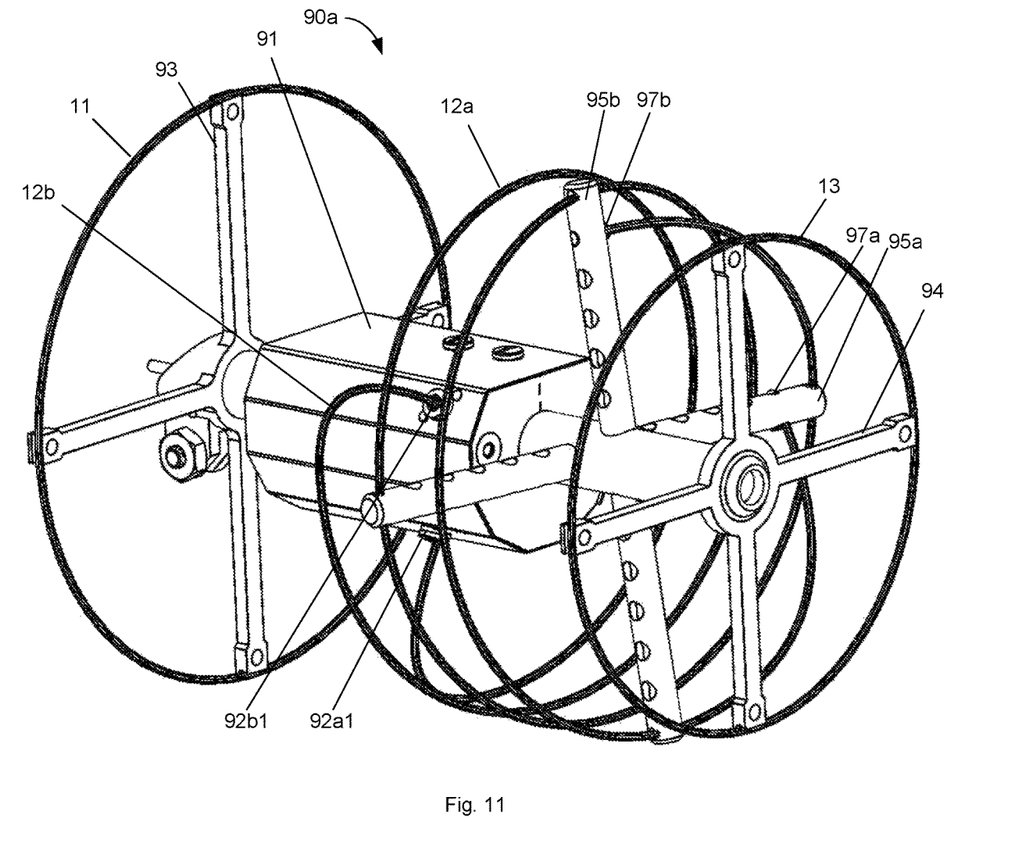
FIG. 11 is a directional dual-elliptical polarization UHF RFID antenna with end-fed exciters and secured distal ends according to one embodiment of the present invention.

Referring now to FIGS. 9,10, and 11 is antenna 90 and 90a, preferred embodiments of a cross-polarized dual-elliptical antenna wherein the major elliptical axis is preferably at least ten times greater than the minor elliptical axis, thus effectively being a dual-linear polarization antenna. Antenna 90 and 90a are comprised of toroidal reflector loop 11 having a diameter of about 4.4 inches which is retained by plastic reflector support 93, a first helical exciter element 12a having a diameter of about 4.0 inches with about 1.2 inches between the turns located on above of the reflector loop, a second exciter element 12b having a diameter of about 4.0 inches with about 1.2 inches between the turns located above and rotated ninety degrees to the first helical exciter element, and a toroidal director loop 13 having a diameter of about 3.7 inches which is retained by plastic director support 94 located above the second helical element 12b. The location relationships described above are for an upward-pointing antenna 90 or 90a with the resulting beam pattern pointing upward above the antenna. In preferred embodiments the reflector, the two exciters, and the director elements are made of 16 AWG half-hard brass wire; when mechanically deformed, they return to their originally-manufactured shape in antenna 90. The toroidal reflector and directors are preferably formed and then held in a closed loop by soldering or brazing the ends together.

Unlike a Quadix antenna, antenna 90 and 90a have helical exciter elements that are, like a monopole, end-fed at feed points 92a1 and 92b1 each comprising a pin receptacle such as Mill Max part 0355-0-15-80-02-27-10-0 each respectively retained by feed point printed circuit boards 92a and 92b. Each printed circuit board 92a and 92b preferably having an impedance matching network comprising a series-connected fixed inductor and a shunt capacitor, both connected to the 150 to 200 ohm proximal end of the helical exciter elements. The two impedance-matching networks are preferably tuned for the best performance from 900 to 930 MHz; they are made using feed point printed circuit boards 92a and 92b for each wherein the 50 ohm unbalanced signal from an active radio circuit is connected through a coaxial cable that is terminated by a coaxial connector, the outer shield of which is preferably terminated to a local metal ground. The local metal grounds from both of the impedance-matching circuits are preferably connected to each other through a conductive metallic skin such as brass sheet metal or copper foil that is wrapped around a hollow central core 91 of a structural material such as plastic. Therefore antenna 90 and 90a have a hollow central core with its proximal end located about 0.8 Inches above the reflector toroid and having an n-side polygon, wherein n can be any number from 3 to 100,000 or a regular or irregular polygon or instead is of a cylindrical shape, any of which with about a 1.5 inch cross section and a length of about 2 inches wherein the outer skin is conductive and provides a ground plane for the exciters and a Faraday cage for any circuits that are inside of it to reduce RF coupling of them with the electromagnetic fields moving in and around the antenna elements. The resulting relative orientation of the two impedance-matching circuits is 90 degrees to each other, like the 90-degree relationship between the two exciters. Within the hollow cavity of the supporting structure of the central core, there is space provided for radio circuits. In a preferred embodiment, an RFID interrogator such as the ThingMagic M6E-M, M6e-Micro, or Impinj Indy RS2000 is embedded within the hollow core with a USB or serial data cable to provide power and communications extending out from it. The combination of antenna 90 or 90a with an embedded RFID interrogator within the hollow cavity together form an integrated RFID reader.

The two U.FL RF connectors located at each of its two RF ports are connected to the RF connectors on each of the two impedance-matching circuits that feed the proximal ends of each of the two 90-degree oriented helical exciters 12a and 12b. In a preferred embodiment port 1 is connected to horizontal helical exciter 12b and port 2 connected to vertical helical exciter 12a. The RFID interrogator antenna interface circuitry alternates between port 1 and port 2 to drive an encoded/modulated carrier wave through antenna 90 to produce an electric field with a certain polarization. Then the RFID interrogator antenna interface circuitry then drives the other port to emit a second encoded/modulated carrier wave through antenna 90 to produce an electric field with a polarization that is about 90 degrees from the first wave. As the RFID interrogator stops modulating the outgoing carrier wave and listens to incoming backscatter from remote RFID transponders, it demodulates and decodes the RF signals that return from remote RFID transponders.

Unlike a Quadix, preferred embodiments of antenna 90 and 90a do not have baluns for connecting the unbalanced signal from the RFID interrogator to the somewhat more balance exciter elements. By not having a balun antenna 90 does not have insertion loss or return loss that are characteristic of a microwave balun; it also means though that return signal currents flow through the coax shield back to the active RF circuit resulting in the coax cable interfering with the formation of the desired radio beam pattern and preferred s-parameters at the feed points. Therefore the coax cables are preferably less than 2 inches long and located completely with the conductive skin of the hollow core of antenna 90 so that the coax cables do not significantly affect the radio beam pattern or s-parameters.

The first and second helical exciters are formed such that the proximal end of the exciter curls inward to connect with its antenna feed point as shown in FIGS. 9-11. The shape of the curl is preferably that of a spline that is tangent to the helical part and perpendicular to the plane of the feed point to which its proximal end terminates, the shape is preferably monotonic.

The conductive skin is preferably made of brass sheet metal or copper foil and is a good conductor of both electric current and heat. The radio gain stage, such as that in the M6E-M produces heat, especially at power levels above 27 dBm. The heat is preferably conducted to the outer skin of the hollow central core. Preferred embodiments use copper ground plane, via arrays, and folded brass sheet metal for efficient thermal transfer of heat from the RFID module to the outer conductive skin.

Horizontal helical support 95a is aligned with the horizontal plane of the antenna. Vertical helical support 95b is aligned with the vertical plane of the antenna. Helical supports 95a and 95b are preferably made of plastic and have minimal contact with exciters 12a and 12b. Vertical exciter 12a is preferably supported by horizontal helical support 95a at two low voltage points in the E-fields that circulate through vertical exciter 12a as shown in FIGS. 9-11. Horizontal exciter 12b is preferably supported by vertical helical support 95b at two low voltage points in the E-fields that circulate through vertical exciter 12a as shown in FIGS. 9-11. In FIG. 11 the distal ends of exciters 12a and 12b are preferably secured by pin receptacle 97a and 97b such as Mill Max part 0355-0-15-80-02-27-10-0 that are embedded into helical supports 95a and 95b respectively. Specifically, the distal end of vertical exciter 12a is supported by a pin receptacle that is embedded into vertical helical support 95b and the distal end of horizontal exciter 12b is supported by a pin receptacle that is embedded into horizontal helical support 95a.

Therefore, in preferred embodiments, the exciters are supported at four points: on the proximal end at the outer surface of the hollow core, at two low voltage points by a first helical support and lastly at the distal end by a second helical support.

In summary, antenna 90a is a dual polarization antenna for scanning RFID transponders comprising: a hollow central core 91 wherein the outer skin is electrically conductive; an RFID interrogator wherein the interrogator is located within the hollow central core 91 with a first 92a1 and a second 92b1 antenna feed point extending through the surface of the skin; a toroidal reflector loop located below the hollow central core; a first helical exciter element 12a located above the reflector loop wherein the proximal end of the exciter curls inward to connect with the first antenna feed point 92a1; a second helical exciter element 12b located above the first helical exciter element 12a wherein the proximal end of the exciter curls inward to connect with the second antenna feed point 92b1; and a toroidal director loop 13 located above the second helical exciter element.

In a preferred embodiment, antenna 90a further comprises a first non-conductive helical support member 95a and a second non-conductive helical support member 95b located above the first non-conductive helical support member 95a. The first exciter element 12a is preferably supported at two points by the first helical support member 95a and the second exciter element 12b is supported at two points by the second helical support member 95b. The first helical support member 95a also preferably supports the distal end of the second exciter 12b. The second helical support member 95b also preferably supports the distal end of the first exciter 12a.

ANSYS HFSS antenna modeling software will display E-field vectors that are preferably used to determine the locations of the low voltage points on the antenna elements. The plastic materials for helical supports 95a and 95b can for example be comprised of ABS, Acrylic, Delrin, Nylon, CPE, or other resins; each different material has characteristic dielectric properties such as dielectric constant and dielectric loss tangent that affect the s-parameters of antenna 90 and the resulting beam pattern.

In another embodiment of antenna 90, the coax cables are longer, extending out from the hollow central core, through the center of the reflector loop, and out the back of the antenna. The conductive skin preferably has a shield connected to it that does not carry return signal back to an active external radio circuit.

Antennae 90 and 90a preferably have a return loss of about −17 dB, a directivity of about 8 dB, and a front-to-back ratio of about 20 dB. Antenna 90 and 90a while delivering these performance benchmarks and operating with dual orthogonal electric field propagation results in an RFID reader antenna with no nulls. This is a significant improvement over prior art RFID antennae. Since modern RFID transponders that are used for identifying assets such as retail items or their containers use simple, low cost antenna structures having a single linear polarization, they must be interrogated by an RFID interrogator and antenna that produce an electric field that has an E-field polarization that is aligned well enough to couple energy into and receive backscatter modulation from the RFID transponders.

Prior art RFID antenna that are currently in popular use produce a circular or elliptical field having an electric field (i.e. E-field) vector that rotates through 360 degrees at quarter wavelength intervals along its propagation path to and from remote RFID transponders (i.e. tag). As the E-field vector rotates, the RSSI of the return signal from an RFID tag varies by about 4 dB from peak to peak. These periodic peaks and nulls are the source of polarization vector noise that greatly reduces the location accuracy of swept beam asset location methods as described below. Antennae 90 and 90a do not have such peaks, nulls, or dead zones because there are two linear polarizations that are concurrently available for reading RFID transponders. This is a significant improvement over prior art.

Antenna 90 or 90a are preferably mounted to a robot or a UAV using plastic structural mount 96 as shown in FIGS. 5, 9, and 10. Other preferred embodiments have a second toroidal director located above the first toroidal director for increased gain.

CPU 52 preferably receives a stream of RFID tag data from each of one or two RFID interrogators that in a preferred embodiment are ThingMagic M6E-M or M6e-Micro dual-port RFID interrogators, capable of sending data at rates of up to 750 tag records per second. Tag data preferably include Meta data such as RSSI and are preferably recorded in memory, including duplicate tag identification numbers. In the present invention CPU 52 uses a time clock to timestamp tag sightings before they are stored in memory. In a preferred embodiment, the CPU and memory are combined within a single device such as the Broadcom BCM2835.

Memory preferably holds records of each tag read and their corresponding timestamp. Estimated reader position and attitude are also recorded with timestamps. Preferred embodiments also run a scan pattern of along various headings in order to enhance RFID tag location data sets recorded in memory. Each point where RFID scan data is collected is a vantage point.

In preferred embodiments CPU 52 captures SGTIN data from RFID tag readings and fuses that with sensor readings from navigation sensor controller 54. The combination of IMU data with SGTINs provide input to an indoor mapping algorithm that localizes RFID reader 1 within its scanning environment, such as a retail sales floor or warehouse. Preferred embodiments extract the EPC manager number from the SGTIN to produce clusters of similarly encoded RFID tags, that is tags that are attached to products from the same brand owner. Since it is typical for retailers to collocate similar products within a store, the EPC manager numbers are also clustered, whereby providing a physical landmark that is used for navigation and mapping of the scan data.

The radiation patterns of dual elliptical antenna 90 or 90a are forward-looking with diminished field strength to the rear, as described by having a high front-to-back ratio. By combining and positioning two antennae 90a in back-to-back along their bore sight axes as shown in FIGS. 1-3 and 6 there is only a slight overlap of the two antenna beam patterns in the region around sensor pod 3b. In preferred embodiments this region of overlapping radio fields is used to localize RFID transponders. By localizing transponders to this region CPU 52 receives scan records from the RFID interrogator in both antennae 90a while navigation sensor controller 54 estimates that RFID reader 1 is a particular position.

When RFID reader 1 moves for example along a path where one antenna 90a points forward and the other antenna 90a points backward, tags near RFID reader 1 will be reported by both antenna at nearly the same time only when those tags are in a location that is lateral to the direction of movement, and within the overlapping radio field zone near sensor pod 3b. This effectively localizes those RFID tags. Or, if the tag position is already known, that known location is used to update the current position estimate from navigation sensor controller 54 to compensate for cumulative IMU drift errors.

In certain preferred embodiments the overlapping radio field zone near sensor pod 3b is used to encode RFID tags. The tag that is to be encoded is positioned within that zone, sequentially read by both readers to confirm the location, whereby isolating it from any other tags that may be nearby. Then one of the two RFID interrogators writes data into that tag, whereby encoding it.

Figure 3:
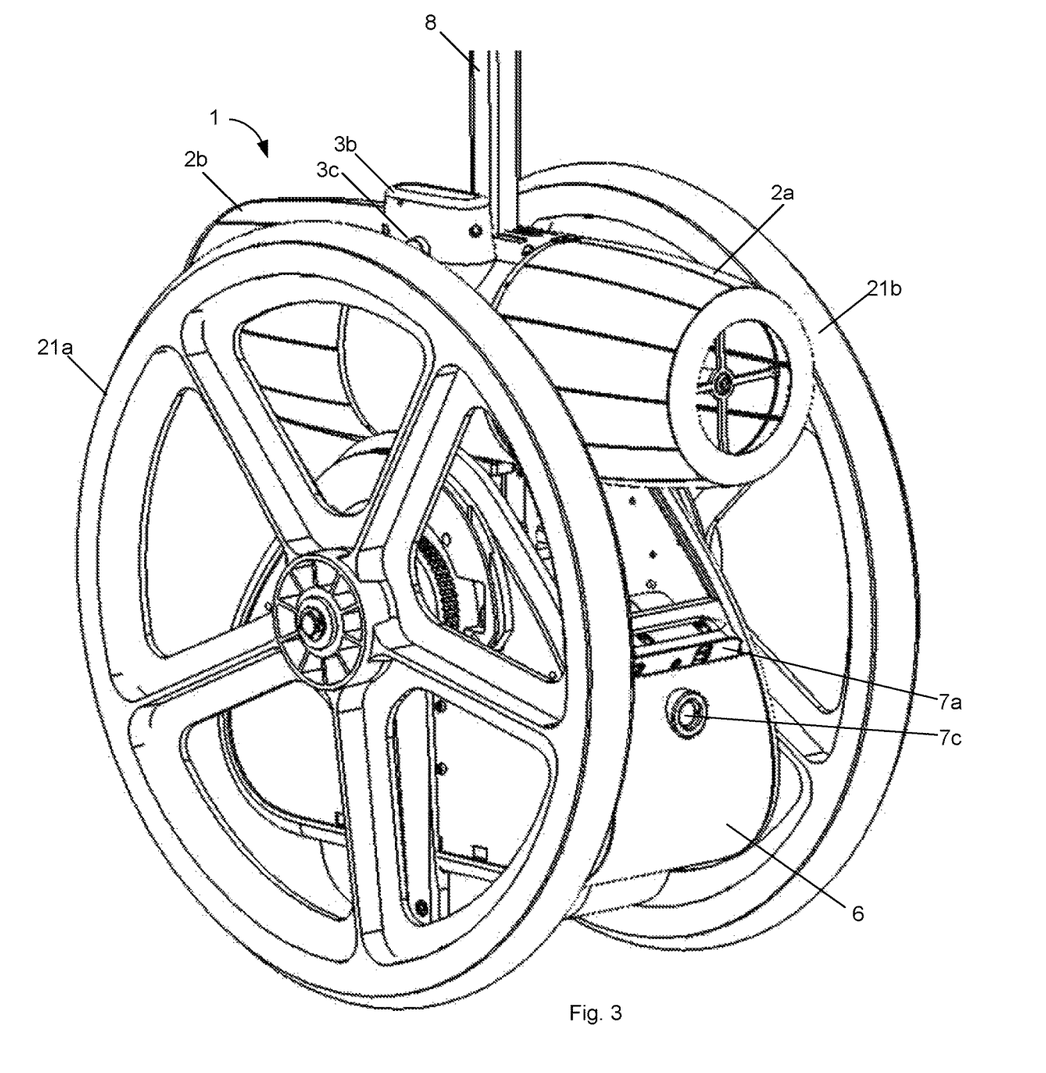
FIG. 3 is an RFID reader with two dual-elliptical polarization directional antennae mounted to a two-wheeled mobile platform according to one embodiment of the present invention.
Figure 6:
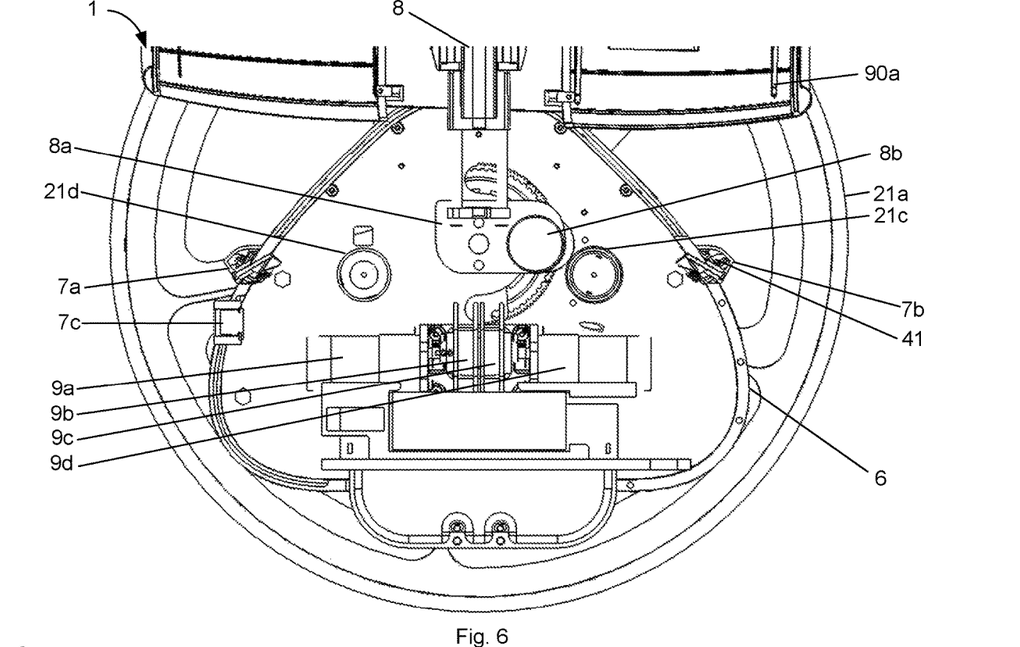
FIG. 6 is a sectional view of a two-wheeled mobile platform according to one embodiment of the present invention.
Figure 7:
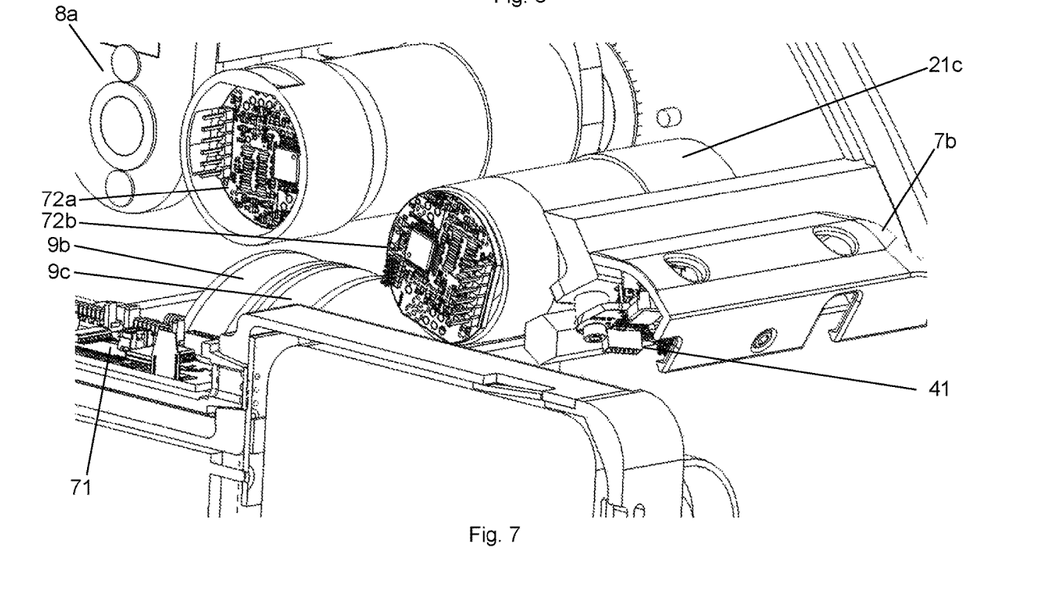
FIG. 7 is a view of sensors, drive systems, and controllers of a two-wheeled mobile platform according to one embodiment of the present invention.

Referring now to FIGS. 3,6,7 showing parts of an autonomous scanning system, preferred embodiments use one or more laser ranging modules 41, show located in sensor housings 7a and 7b. Each has a 940 nm VCSEL emitter (Vertical Cavity Surface-Emitting Laser) for a Time-of-Flight laser ranging module. It measures the distance to objects that reflect light, at ranges of up to 4 meters. Preferred embodiments use these small sensors to sense people and objects in the environment around robot 70. They offer a key advantage for retail store scanning applications because the VL53L1X, made by ST will sense fabric items such as saleable retail store apparel that would not be detectable by sonar sensors.

In another preferred embodiment, use a Lidar that emits laser light, preferably in the 600 to 1000 nm wavelength range. A laser diode is focused through a lens apparatus and directed using microelectromechanical systems (MEMS) mirrors for example. Preferred laser beam scan patterns include general forward-looking patterns, sweeping the area in front of the UAV, or patterns that sweep through broader angles including a full 360-degree field of view. Raster scan patterns sweep through yaw and azimuth angles. A Lidar receives and analyzes the reflections off of objects that surround robot 70. Return light is amplified and processed to create a map or to determine the position of robot 70 within an existing map for navigation.

Cameras such as camera 24 are also preferably used to navigate and avoid obstacles. Techniques include tracking the centroid of optical references, optical flow, and vanishing point navigation to recognize and guide a path for robot 70 through aisles. Optical flow is the pattern of apparent motion of objects, surfaces, and edges in a retail store caused by the motion of the camera. Vanishing point navigation uses the parallel lines of store aisle, shelves, windows, and overhead lighting rails to compute a distant target, such as the end of an aisle; it also provides visual angular alignment for squaring reader 1 for accurate triangulations and transponder location measurements.

RFID reader 1 reads the identity and actual locations of RFID-tagged merchandise. An embodiment of a non-holonomic mobile platform is shown in FIGS. 3 and 6 having two wheels 21a and 21b, driven by gearmotors 21c and 21d respectively, that independently rotate in either a clockwise or counter-clockwise direction to create forward or reverse motions or in opposing directions for a turn or rotation of RFID reader 1 about a fixed point on the floor. Gearmotors 21*c-d* preferably couple with wheels 21*a-b* using timing belts. Servo controllers 72*a* and 72*b* provide closed loop motor control for gearmotors 8*b* and 21*c* respectively. Servo controllers 72*a-b* preferably use shaft encoder phase quadrature signal feedback from the gearmotors such as Pololu 100:1 Metal Gearmotor 37Dx73L mm with 64 CPR Encoder. That feedback provides the error signal that is needed to feed a PID servo control loop in NXP microcontroller Kinetis MKV10Z32VLC7 which has a 75 MHz ARM Cortex-M0+ core and a phase quadrature decoder and counter for accurate tracking of motor drive shaft rotation. Motor currents are preferably controlled by a pulse-width-modulated motor driver such as VNH7070ASTR by ST micro.

Figure 1:
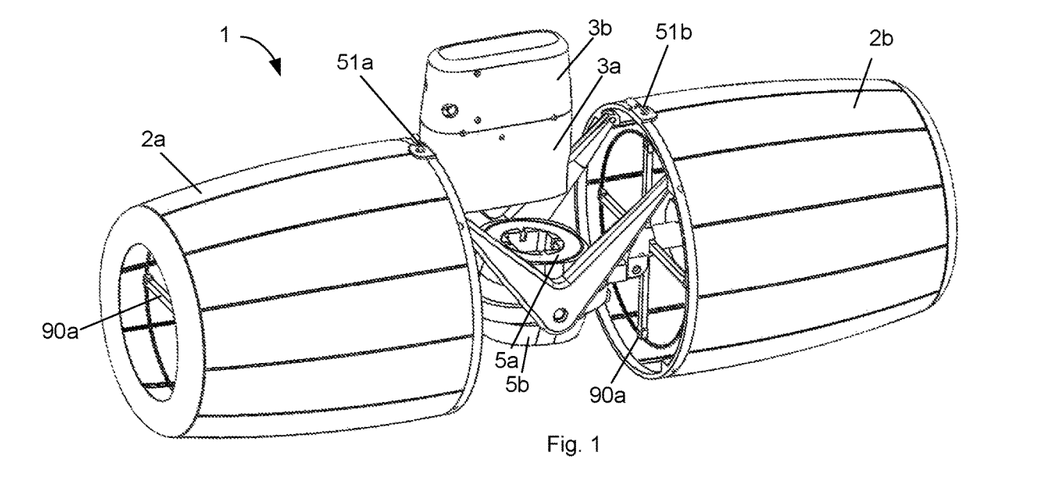
FIG. 1 is an RFID reader with two dual-elliptical polarization directional antennae adapted for mounting to a boom according to one embodiment of the present invention.
Figure 8:
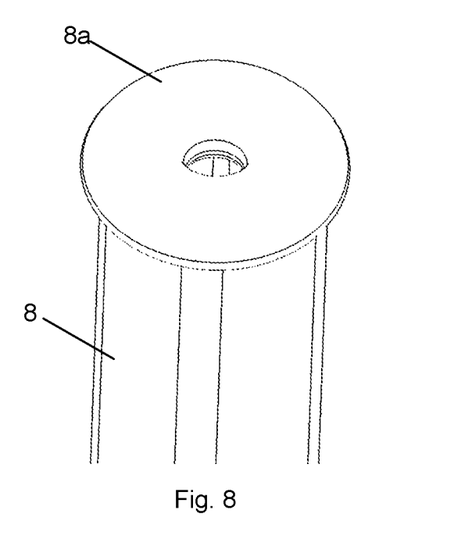
FIG. 8 is a view of the top of a boom according to one embodiment of the present invention.

Boom 8 is preferably made of carbon-fiber tubing to support RFID reader 1 and provide a vertical path to change its altitude. Lift points 51*a* and 51*b* of FIG. 1 are used to attach lifting wires such as a multi-strand 28 AWG Teflon-coated wire (not shown). The lifting wires extend upward from lift points 51*a,b* and turn about 180 degrees to pass through the orifice of boom ring 8*a* of FIG. 8 which is made of a low friction material. The center of boom 8 is used to route the two wires to coaxial spools 9*b* and 9*c* of FIG. 6. Spool 9*b* is independently driven by gear motor 9*a*, and spool 9*c* is independently driven by gearmotor 9*d*.

BotController 71 powers, controls, and coordinates motion of five gearmotors; on the winches are 9*a-b*, for wheel drives are gearmotors 21*c-d*, and boom leveler uses gearmotor 8*b*. It also receives ranging data from laser ranging modules 41*a* and 41*b*, and sonar ranging data from sonar 7*c*.

Boom 8 remains upright using gearmotor 8*b* to pivot the boom mount 8*a* using an accelerometer to respond to changes in the tilt angle of boom 8. The boom will also tilt as the robot accelerates and decelerates.

As RFID reader 1 traverses a retail sales floor, warehouse, or inventory storage area, it may from time to time encounter obstacles that are detected by various sensors including sonar 7*c* and time-of-flight laser ranging modules 41. Onboard computers preferably detect and respond to sensor inputs and preferably learn by recording previous encounters with obstacles at certain locations, and reuse successful maneuvers to escape from known obstacles. Sonar module 7*c* reports range to objects that reflect acoustic waves and enable RFID reader 1 to stop or to take evasive action. Escape maneuvers of preferably include reversing, pivoting, and changing direction to go around obstacles such as walls, furniture, and movable objects.

CPU 52 communicates with one or two Jadak M6E-M or M6e-Micro RFID readers located within antenna 90 or 90*a* using a USB connection. Information from RFID reader 1 is preferably collected and stored in an SQLite database. In a preferred embodiment, SGTINs are associated with location information. In some embodiments, location is information is augmented by reading fixed location RFID transponders that are encoded with location codes.

Transponder location information preferably references a system or references points that extend beyond the boundaries of the room or space in which RFID reader 1 is operating. A plurality of transponders can therefore have a distance between them that is greater than the physical dimensions of the space that they are contained within. For example, in a preferred embodiment, RFID location transponders are encoded with high-resolution longitude and latitude information. A preferred location identifier for an RFID transponder uses GPS coordinates. Such a location system is preferably used to track the locations of goods on a global scale.

A database preferably collects transponder identities and locations from RFID reader 1 and others like it in facilities around the world. RFID readers 1 periodically upload data to the database when Wi-Fi, 3G, 4G, or 5G wireless services are available.

A preferred database comprises data fields to report the locations of associated transponders to consumer devices wherein the associations are defined by characteristics of the objects that the transponders are attached to. The associations preferably comprise characteristics that include and are defined by fashion, style, or personal preferences. The database preferably accounts for fashion and style changes and alters the associations so that consumers will be more likely result to buy.

In this and other embodiments the narrow beam improves transponder location accuracy by reducing off-axis reads and reflections that confound tag location efforts. When an aggregate number of such reads are processed using triangulation, then the resulting tag location accuracy is greatly improved over prior art systems, methods, and devices.

Figure 2:
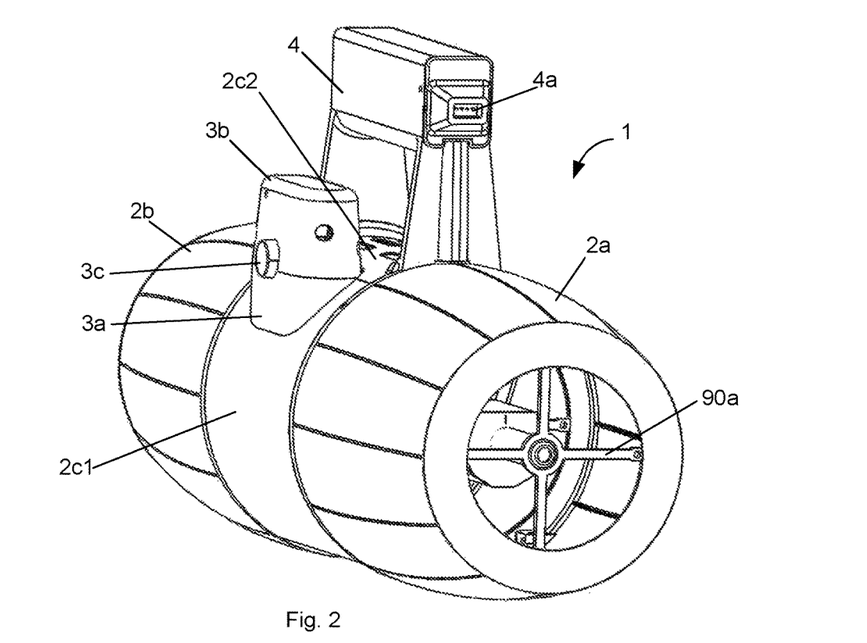
FIG. 2 is an RFID reader with two dual-elliptical polarization directional antennae adapted for manual scanning according to one embodiment of the present invention.

Referring now to FIG. 2 is a preferred embodiment RFID reader 1 that is hand-carried using handle 4. Connector 4*a* connects to a LiPo battery embedded in handle 4 and provides DC power to RFID reader 1. Holonomic motion of reader 1 is provided by a combination of reader 1 with a human operator to move in translational axes x, y, z, and rotation axes θ and φ while reader 1 dynamically switches between horizontal and vertical beam polarizations to provide a sixth degree of freedom in the ρ axis. In this embodiment, CPU 52 preferably communicates with a mobile device such as a smart phone to report scanning progress and to direct the operator's holonomic movements of RFID reader 1. In other words, reader 1 with the IMU of navigation sensor controller 54 instructs an operator to move in any direction at any time.

In another preferred embodiment RFID reader 1 has two RFID interrogators as above but instead with reader antennae of different types. One type is as described above, the other is a conventional flat circularly polarized (CP) antenna. The RFID interrogator such as a ThingMagic M6E-M is attached to the CP antenna though one of its ports; the other port connects to a short range, near field coupler for encoding RFID transponders.

RFID transponders are fed to the near field coupler from a source roll of RFID transponders that is preferable cradled on a pair of rollers. Within the core of the roll of transponders is a tension wheel that is in contact with the inner surface of what is normally a paper fiber tube. Tension is created by a drive motor that is attached to a second paper fiber tube, preferably of a small diameter such as one inch. This second tube serves as a take-up roll of empty release liner and may also have attached to it unencoded RFID transponders. The loose end of the release liner coming from the source roll is attached to the outer surface of the take-up roll using for example clear packing tape. Torque is created by the motor, transmitted through a coupling to the take-up roll, whereby creating tension through the tape and release liner. The release liner passes around a sharp peel plate that is positioned such that RFID transponders partially release from the release liner as the liner passes around the sharp edge of the peel plate. The peel plate is preferably positioned such that the partially released transponder is located within the magnetic field region of the near field coupler for interrogation and encoding. The motor preferably advances forward as the RFID interrogator interrogates and subsequently confirms the presence of a blank unencoded RFID transponder.

The encoding process preferably begins with a command from a computer or from an attached barcode scanner.

In a preferred embodiment RFID reader 1 and RFID encoder are combined onto a mobile platform. The mobile platform preferably moves through a retail store reading RFID tags and providing encoded RFID tags to an operator.

Figure 12:
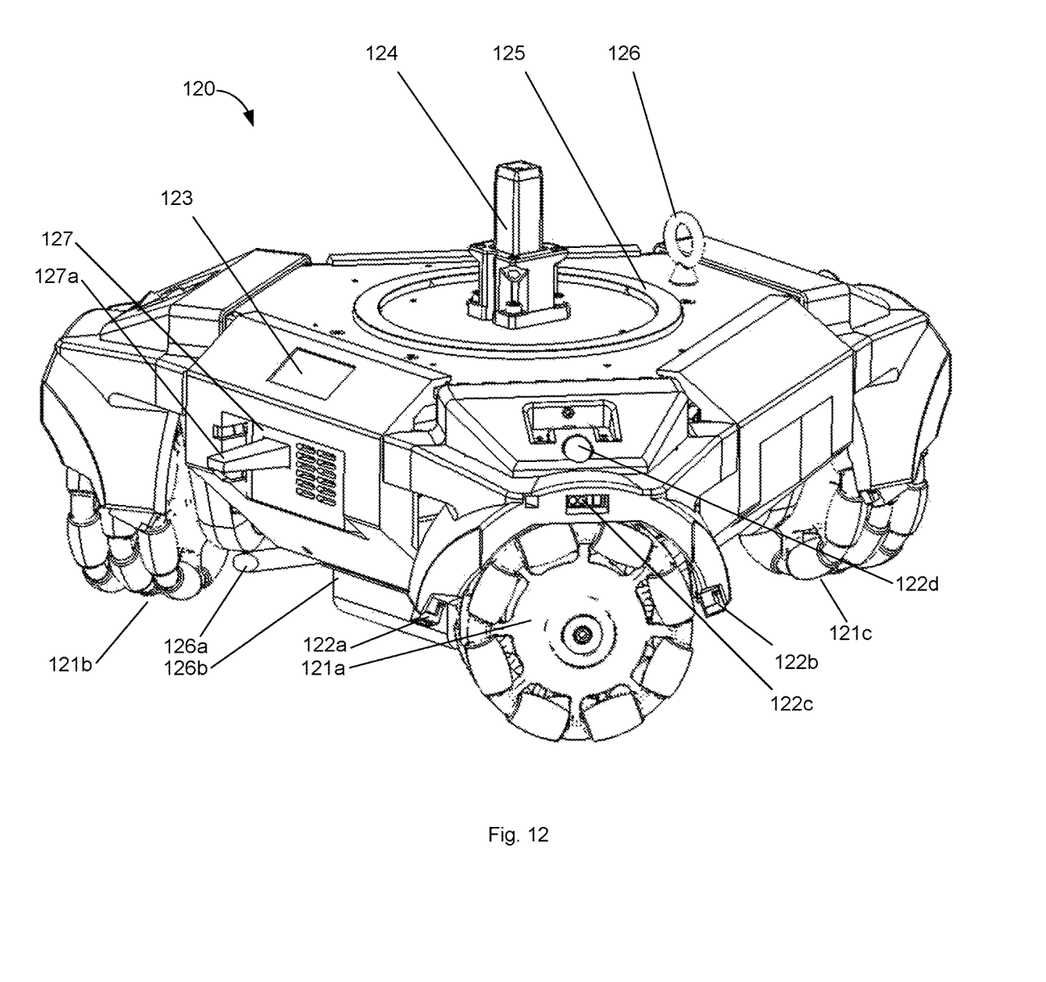
FIG. 12 is a view of a holonomic mobile platform according to one embodiment of the present invention.
Figure 13:
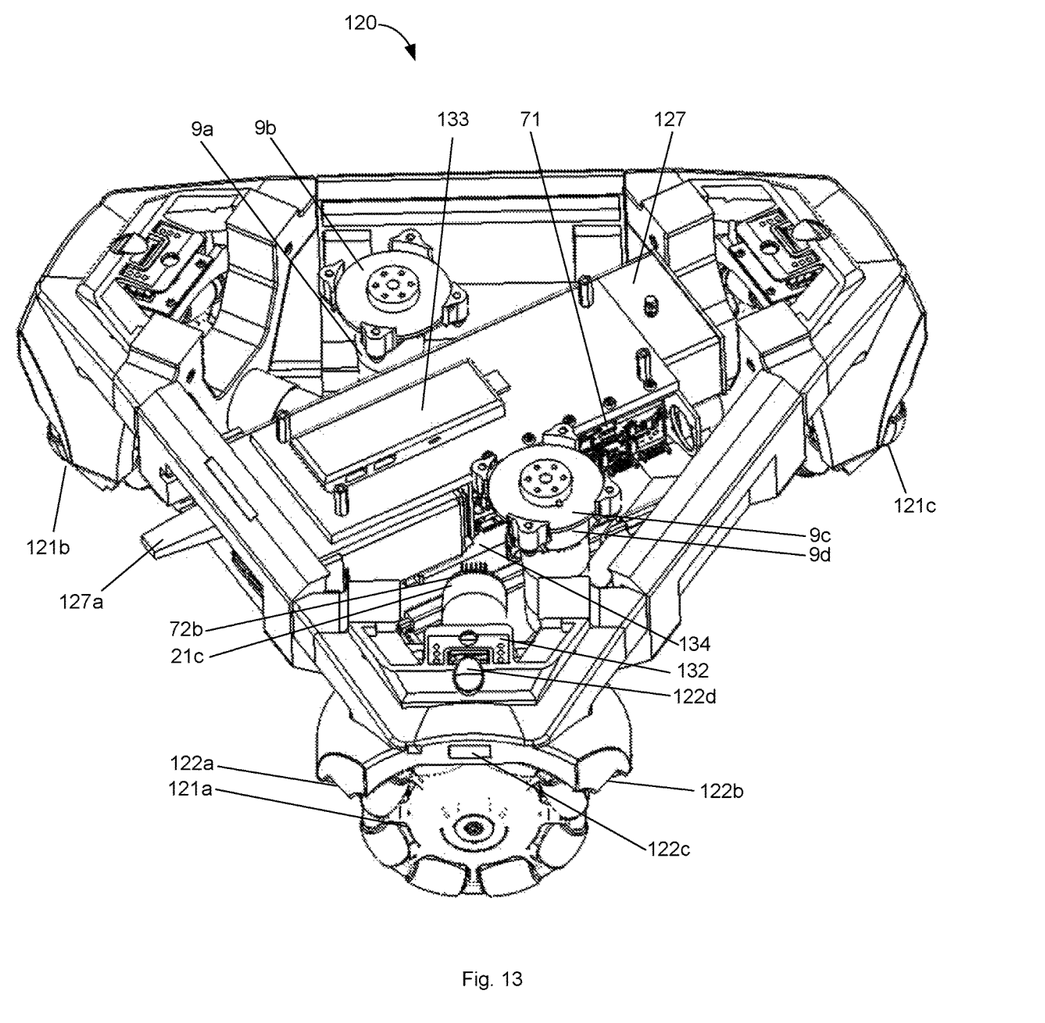
FIG. 13 is a sectional view of a holonomic mobile platform according to one embodiment of the present invention.

In another preferred embodiment, mobile platform 120 is shown in FIGS. 12-13 and is preferably compact, having holonomic movement, three degrees of freedom (x, y, θ) for operation in tight spaces, and an overall size and shape that is sufficiently small to fit into a travel case such as those manufactured by Pelican.

Holonomic mobile platform 120 preferably has three or four omni-directional wheels. In FIGS. 12-13 three omni-directional wheels 121*a-c* are for example a Rotacaster 125 mm diameter Triple Polyurethane Roller omni-directional wheel from Rotacaster Wheel Pty Limited of Beresfield, New South Wales, Australia. Omni-wheel 121*a* is driven by gearmotor 21*c* and controlled by servo controller 72*b* as shown in FIG. 13. Being holonomic means that simultaneous movement and rotation is possible in any direction.

Boom 8 of FIG. 3 is preferably mated with boom mount 124 of FIG. 12 such that RFID reader 1 of FIG. 1 is transported by mobile platform 120 with three degrees of freedom (x, y, θ). Winch spools 9*b* and 9*c* are driven and controlled by gearmotors 9*a* and 9*d* as shown in the sectional view of platform 120 in FIG. 13. Winch spools 9*b-c* spool two separate Teflon-insulated 28AWG wires that are connected to RFID reader 1 such that not only is RFID reader 1 raised and lowered with a z axis degree of freedom, but also driven by the winches differentially such that RFID reader 1 has a controllable pitch axis φ. Additionally, dual polarization RFID reader 1 has at least one antenna 90 or 90*a* that has two polarization planes: horizontal where the roll angle ρ is zero degrees, and vertical where the roll angle ρ is 90 degrees. Thus, the combination of RFID reader 1 with the mobile platform 120 results in a holonomic RFID reader with six degrees of freedom (x, y, z, ρ, θ, φ).

The roll angle ρ is an electronically dynamic polarization angle that requires no moving parts as described above for antennae 90 and 90*a*. Each of the other degrees of freedom (x, y, z, θ, φ) each use one gearmotor to control movement. Therefore, a preferred embodiment of the combined RFID reader 1 combined with platform 120 having six degrees of freedom uses only five servo-controlled motors.

In a preferred embodiment navigation sensor controller 54 executes a scan plan, commanding mobile platform 120 to certain x, y, θ planar locations and scan angles where for example RFID reader 1 scans RFID tags as it moves through z axis heights and φ pitch angles as the readers of RFID reader 1 alternate between ρ roll polarization angles. In a preferred embodiment a C program stores a record for every SGTIN found in an SQLite table. Each table can be saved in RAM and subsequently stored in a file for every x, y, θ position and angle. Records from reader A would for example be at angle θ, and from the opposite-facing reader B at angle 180+θ. This data storage method can be used for either the human-carried reader 1 or a version of reader 1 that is transported on mobile platform 120.

Mobile platform 120 preferably senses and avoids objects and cliffs such as steps using sensors. A preferred arrangement of sensors is shown in FIGS. 12-13 where a set of five sensors are arranged around each of the three omni-directional wheels 121*a-c*. Cliff sensors 121*a* and 121*b* are preferably short range 2-15 cm optical sensors such as Sharp model GP2Y0A51SK0F that point downward and typically consume only 60 mW for normal operation. Lateral optical object sensor 122*c* is preferably a Sharp model GP2Y0A02A having 4-50 cm of sensing range using only 86 mW of power. Vertical optical sensor 132 is preferably an ST model VL53L1X offering up to 400 cm of ranging distance using Time-of-Flight laser ranging sensor technology using only 20 mW. Like sonar 3*c*, sonar 122*d* is preferably a MaxBotix LV-MaxSonar-EZ0 MB1000 or similar device having a range of up to 254 inches (over 21 feet) using only 10 mW. Ranging is preferably controlled and monitored at each of the three omni-directional wheel corners by a microcontroller such as an NXP Kinetis MKV10Z32VLC7, results are combined and reported to BotController 71.

Cliff avoidance is critical for protection of RFID reader 1 from damage due to a fall, especially from heights attained by vertical z axis movement along boom 8. If either cliff sensor 122*a* or 122*b* detect a sudden increase in range that exceeds the normal height above a floor, then a signal is sent by the microcontroller that is monitoring the signals from those sensors. The signal is received by BotController 71 which responds by sending signals to servo-controllers 72*b* to stop or change the velocity of gearmotors 21*c* driving omni-directional wheels 121*a-c*.

RFID reader 1 when coupled with mobile platform 120 is preferably powered by a four-cell LiPo battery 127 shown in FIGS. 12-13. Battery 127 is preferably removable for replacement by a fully charged battery. Charging is preferably performed when battery 127 is either within mobile platform 120 or set aside on a bench for example. Charging is performed by an embedded cell-balancing charger powered by AC line cord 127*a*.

In order to keep RFID reader 1 and mobile platform 120 powered up during a change of LiPo battery 127, back-up sealed lead acid (SLA) battery 134 provides power instead. BotController 71 preferably has an SLA battery charging circuit that maintains a full charge on battery 134.

Computer 133 is preferably a 32-bit computer such as an Intel Compute Stick running Linux. Computer 133 preferably connects through a USB port and USB cable to communicate with BotController 71.

Holonomic control for simultaneous translation and rotation in a 2D plane and operation in tight spaces that are increasingly common on retail sales floors. A preferred scanning method is for RFID reader 1 to move down a store aisle with antennae boresights at a 20 to 30-degree angle relative to the direction of motion. RFID reader 1 provides long-range illumination of the RFID transponders on objects that are well ahead of and behind reader 1, as well as interrogation of RFID transponders to one side of the aisle for each antenna, albeit at reduced RF power due to the directional beam patterns. CPU 52 preferably records metadata such as RSSI, read count, and phase angle and monitors that data for each tag as long as it is within the read field. When a tag enters or exits the field, CPU 52 preferably computes an estimate of each tags location.

Scanning in this manner is preferably performed at various z axis elevations of RFID reader 1 to localize RFID-tagged inventory that is stored anywhere from floor level to heights over 6 feet. Pitch angle φ is increased to at least 20 degrees above or below level to point antenna boresights to illuminate RFID transponders located at extreme heights within a 3D space above or below what shoppers may consider as waist high.

RFID reader 1 preferably provides a visual display of its activity and progress using Red-Green-Blue (RGB) LED display 125. A preferred embodiment has 60 WS2812B or WS2812 5050 RGB LEDs, each with serial data in and out pins to each receive commands from a processor that through precise signal timing controls the color and intensity of each LED.

Control panel 123 preferably enables a user to control modes of operation or to stop movement using a simple switch.

Eye bolt 126 is preferably used to secure RFID reader 1 and mobile platform 120 during storage or transport using for example a bicycle locking cable.

While the invention has been particularly shown and described with reference to certain embodiments, it will be understood by those skilled in the art that various changes in form and detail may be made without departing from the spirit and scope of the invention.

The invention claimed is:

1. An RFID reader system comprising:
   a first RFID reader comprising:
      a central core wherein the outer skin is electrically conductive;
      a two-port RFID interrogator radio module wherein the module is located embedded within the central core with a first and a second antenna feed point extending through the surface of the skin;
      a toroidal reflector loop located below the central core;
      a first exciter element located above the reflector loop wherein the proximal end of the exciter curls inward to connect with the first antenna feed point;
      a second exciter element located above the first helical exciter element wherein the proximal end of the exciter curls inward to connect with the second antenna feed point;
      a toroidal director loop located above the second helical exciter element; and
   at least one position-estimating sensor attached to the RFID reader to provide location information to a navigation sensor controller wherein the navigation sensor controller estimates the position of the first RFID reader.

2. The RFID reader system of claim 1, further comprising an IMU to provide information to the navigation sensor controller to improve the estimate.

3. The RFID reader system of claim 1, wherein the position-estimating sensor is a Time-of-Flight laser ranging sensor.

4. The RFID reader system of claim 1, wherein the position-estimating sensor is a sonar.

5. The RFID reader system of claim 1, further comprising a second RFID reader comprising:
   a central core wherein the outer skin is electrically conductive;
   a two-port RFID interrogator radio module wherein the module is located embedded within the central core with a first and a second antenna feed point extending through the surface of the skin;
   a toroidal reflector loop located below the central core;
   a first exciter element located above the reflector loop wherein the proximal end of the exciter curls inward to connect with the first antenna feed point;
   a second exciter element located above the first helical exciter element wherein the proximal end of the exciter curls inward to connect with the second antenna feed point;
   a toroidal director loop located above the second helical exciter element, wherein the first RFID reader and the second RFID reader are connected together in opposing directions.

6. The RFID reader system of claim 1 further comprising a computer for receiving and storing data from the first RFID reader and/or the second RFID reader.

* * * * *